(12) United States Patent
Hong et al.

(10) Patent No.: US 10,763,541 B2
(45) Date of Patent: Sep. 1, 2020

(54) NON-AQUEOUS ELECTROLYTE FOR LITHIUM SECONDARY BATTERY AND LITHIUM SECONDARY BATTERY COMPRISING THE SAME

(71) Applicant: LG CHEM, LTD., Seoul (KR)

(72) Inventors: Yeon-Suk Hong, Daejeon (KR);
Kwon-Young Choi, Daejeon (KR);
Jae-Seung Oh, Seoul (KR);
Byoung-Bae Lee, Daejeon (KR);
Kyung-Hwan Jung, Daejeon (KR);
Hye-Yeong Sim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/765,141

(22) Filed: Feb. 12, 2013

(65) Prior Publication Data

US 2013/0157116 A1 Jun. 20, 2013

Related U.S. Application Data

(63) Continuation of application No. PCT/KR2011/005953, filed on Aug. 12, 2011.

(30) Foreign Application Priority Data

Aug. 13, 2010 (KR) .................. 10-2010-0078417
Aug. 12, 2011 (KR) .................. 10-2011-0080493

(51) Int. Cl.
*H01M 10/056* (2010.01)
*H01M 10/052* (2010.01)
(Continued)

(52) U.S. Cl.
CPC ....... *H01M 10/056* (2013.01); *H01M 10/052* (2013.01); *H01M 10/0567* (2013.01); *H01M 10/0569* (2013.01); *Y02T 10/7011* (2013.01)

(58) Field of Classification Search
CPC ................. H01M 6/14; H01M 10/056; H01M 10/0564–0569
See application file for complete search history.

(56) References Cited

U.S. PATENT DOCUMENTS 7,442,471 B1 * 10/2008 Jow ...................... H01M 6/164
252/62.2
8,697,295 B2 4/2014 Fujii et al.
(Continued)

FOREIGN PATENT DOCUMENTS

JP 11185808 A 7/1999
JP 2001-015158 A 1/2001
(Continued)

OTHER PUBLICATIONS

International Search Report issued in PCT/KR2011/005953, dated Apr. 4, 2012.
Written Opinion issued in PCT/KR2011/005953, dated Apr. 4, 2012.

*Primary Examiner* — Haixia Zhang
(74) *Attorney, Agent, or Firm* — Lerner, David, Littenberg, Krumholz & Mentlik, LLP

(57) ABSTRACT

Disclosed is a non-aqueous electrolyte for a lithium secondary battery and a lithium secondary battery comprising the same. The non-aqueous electrolyte including an ionizable lithium salt and an organic solvent may further include (a) 1 to 10 parts by weight of a compound having a vinylene group or vinyl group per 100 parts by weight of the non-aqueous electrolyte, and (b) 10 to 300 parts by weight of a dinitrile compound having an ether bond per 100 parts by weight of the compound having the vinylene group or vinyl group. The lithium secondary battery comprising the non-aqueous electrolyte may effectively suppress the swelling and improve the charge/discharge cycle life.

9 Claims, 3 Drawing Sheets

(51) Int. Cl.
*H01M 10/0569* (2010.01)
*H01M 10/0567* (2010.01)

(56) References Cited

U.S. PATENT DOCUMENTS

| | | |
|---|---|---|
| 2002/0102466 A1 | 8/2002 | Hwang et al. |
| 2007/0042267 A1 | 2/2007 | Kim et al. |
| 2008/0014496 A1 | 1/2008 | Watanabe et al. |
| 2008/0153006 A1* | 6/2008 | Oh .................... H01M 10/0525 429/332 |
| 2008/0241670 A1 | 10/2008 | Kim et al. |
| 2010/0035146 A1* | 2/2010 | Fujii et al. .................... 429/200 |

FOREIGN PATENT DOCUMENTS

| | | |
|---|---|---|
| JP | 2008-235008 A | 10/2008 |
| JP | 2009-32653 A | 2/2009 |
| KR | 2002-0008705 A | 1/2002 |
| KR | 10-2007-0021433 A | 2/2007 |
| KR | 10-0816208 B1 | 3/2008 |
| WO | WO 2008/069267 A1 | 6/2008 |
| WO | WO 2008069267 A1 * | 6/2008 |
| WO | WO 2009/131419 A2 | 10/2009 |

* cited by examiner

NON-AQUEOUS ELECTROLYTE FOR LITHIUM SECONDARY BATTERY AND LITHIUM SECONDARY BATTERY COMPRISING THE SAME

CROSS-REFERENCE TO RELATED APPLICATION

This application is a continuation of International Application PCT/KR2011/005953 filed on Aug. 12, 2011, which claims priority from Korean Patent Application No. 10-2010-0078417, filed on Aug. 13, 2010 and Korean Patent Application No. 10-2011-0080493 filed on Aug. 12, 2011, the entire disclosure of which is incorporated herein by reference for all purposes.

BACKGROUND

Field

The present invention relates to a non-aqueous electrolyte for a lithium secondary battery including a dinitrile-based additive to improve the cycle life and suppress swelling, and a lithium secondary battery comprising the same.

Description of Related Art

Recently, there is an increasing interest in energy storage technologies. As the application fields of energy storage technologies have been extended to mobile phones, camcorders, lap-top computers, and even electric cars, the demand for high energy density of batteries used as power sources of electronic equipment has been increasing. Lithium secondary batteries are given attention as the most favorable battery capable of meeting the demand, and currently studies are being actively made on lithium secondary batteries.

Lithium secondary batteries developed in the early 1990's are made up of an anode of a carbon-based material capable of intercalating and deintercalating lithium ions, a cathode of lithium containing oxide, and a non-aqueous electrolyte containing a proper amount of lithium salts dissolved in a mixed organic solvent.

Recently, with the expanded use of lithium secondary batteries, there is an increasing demand for lithium secondary batteries capable of safely charging in extreme conditions, such as high or low temperature and high voltage conditions, while maintaining excellent performance.

Lithium secondary batteries use, as a cathode active material, lithium transition metal oxide or composite oxide of which the structural stability and the capacity are determined by the intercalation and deintercalation of lithium ions, and the capacity increases with the increasing charge potential, which accelerates the discharge of transition metal constituting the active material, resulting in structural instability.

At present, an organic solvent widely used in a non-aqueous electrolyte includes ethylene carbonate, propylene carbonate, dimethoxy ethane, γ-buryrolactone, N,N-dimethylformamide, tetrahydrofuran, acetonitile, and the like. However, when these organic solvents are stored at high temperature for a long time, batteries may deteriorate due to gas generated by electrolyte oxidation and consequently swelling. In this instance, the generated decomposition gas deforms a pouch-shaped electrode assembly or a cylindrical or prismatic electrode assembly, resulting in internal short circuit. In severe cases, ignition or explosion of batteries may occur. The electrolyte oxidation may be accelerated by the elution of transition metal under high voltage conditions.

To solve these problems, a variety of additives used in a non-aqueous electrolyte have been suggested to prevent batteries from swelling, however to date, there is no effective solution. For example, when succinonitrile is added to an electrolyte, swelling may be suppressed to some extent but charge/discharge cycle life reduces.

DISCLOSURE

Accordingly, it is an object of the present invention to provide a non-aqueous electrolyte for a lithium secondary battery that may suppress swelling of the battery and improve the charge/discharge cycle life, and a lithium secondary battery comprising the same.

In order to achieve this object, the present invention provides a non-aqueous electrolyte for a lithium secondary battery including an ionizable lithium salt and an organic solvent, and further including (a) 1 to 10 parts by weight of a compound having a vinylene group or vinyl group per 100 parts by weight of the non-aqueous electrolyte, and (b) 10 to 300 parts by weight of a dinitrile compound having an ether bond represented by the following chemical formula 1 per 100 parts by weight of the compound having the vinylene group or vinyl group:

   [Chemical formula 1]

where $R_1$ to $R_3$ are each independently $C_1$-$C_5$ alkylene or alkenylene, and m is an integer of 1 to 5.

In the present invention, the "vinylene group" is defined as —CH=CH—, and the "vinyl group" is defined as $CH_2$=CH—. The compound having the vinylene group or vinyl group of the present invention may include any one of a vinylene carbonate-based compound, an acrylate-based compound having a vinyl group, a sulfonate-based compound having a vinyl group, and an ethylene carbonate-based compound having a vinyl group, or mixtures thereof. Typically, the vinylene carbonate-based compound is, for example, vinylene carbonate. More specifically, the compound having the vinyl group may be represented by the following chemical formula 2:

[Chemical formula 2]

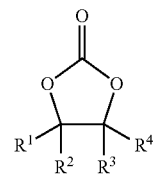

where at least one of $R_1$ to $R_4$ has a vinyl group, and the others are each independently hydrogen, halogen, a $C_1$-$C_6$ alkyl group unsubstituted or substituted with halogen, a $C_6$-$C_{12}$ aryl group, a $C_2$-$C_6$ alkenyl group, or a sulfonate group.

In the non-aqueous electrolyte of the present invention, the dinitrile compound having an ether bond may include, but is not limited to, any one of 3,5-dioxa-heptanedinitrile, 1,4-bis(cyanoethoxy)butane, bis(2-cyanoethyl)-monoformal, bis(2-cyanoethyl)-diformal, bis(2-cyanoethyl)-triformal, ethyleneglycol bis(2-cyanoethyl)ether, diethyleneglycol bis(2-cyanoethyl)ether, triethyleneglycol bis(2-cyanoethyl)ether, tetraethyleneglycol bis(2-cyanoethyl) ether, 3,6,9,12,15,18-hexaoxaeicosane dinitrile, 1,3-bis(2-cyanoethoxy)propane, 1,4-bis(2-cyanoethoxy)butane, 1,5- bis(2-cyanoethoxy)pentane, and ethyleneglycol bis(4-cyanobutyl)ether, or mixtures thereof.

Optionally, the non-aqueous electrolyte of the present invention may further include cyclic carbonate substituted with halogen represented by the following chemical formula 3:

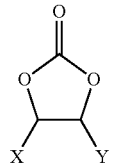

[Chemical formula 3]

where X and Y are each independently hydrogen, chlorine, or fluorine, and both X and Y are not hydrogen.

The content of a mixture of the cyclic carbonate substituted with halogen and the compound having the vinylene group or vinyl group may be 1 to 10 parts by weight per 100 parts by weight of the non-aqueous electrolyte.

In the non-aqueous electrolyte of the present invention, an anion of the lithium salt may be, for example, any one of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2 N^-$.

In the non-aqueous electrolyte of the present invention, the organic solvent may include any one of ether, ester, amide, linear carbonate, cyclic carbonate, or mixtures thereof.

The non-aqueous electrolyte of the present invention may be used in the type of a liquid electrolyte as it is, or a gel polymer electrolyte prepared by impregnating a polymer with a liquid electrolyte.

When the non-aqueous electrolyte of the present invention is used in the type of a liquid electrolyte, the electrolyte may be injected into a battery casing receiving an electrode assembly to fabricate a lithium secondary battery.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

Figure 1:
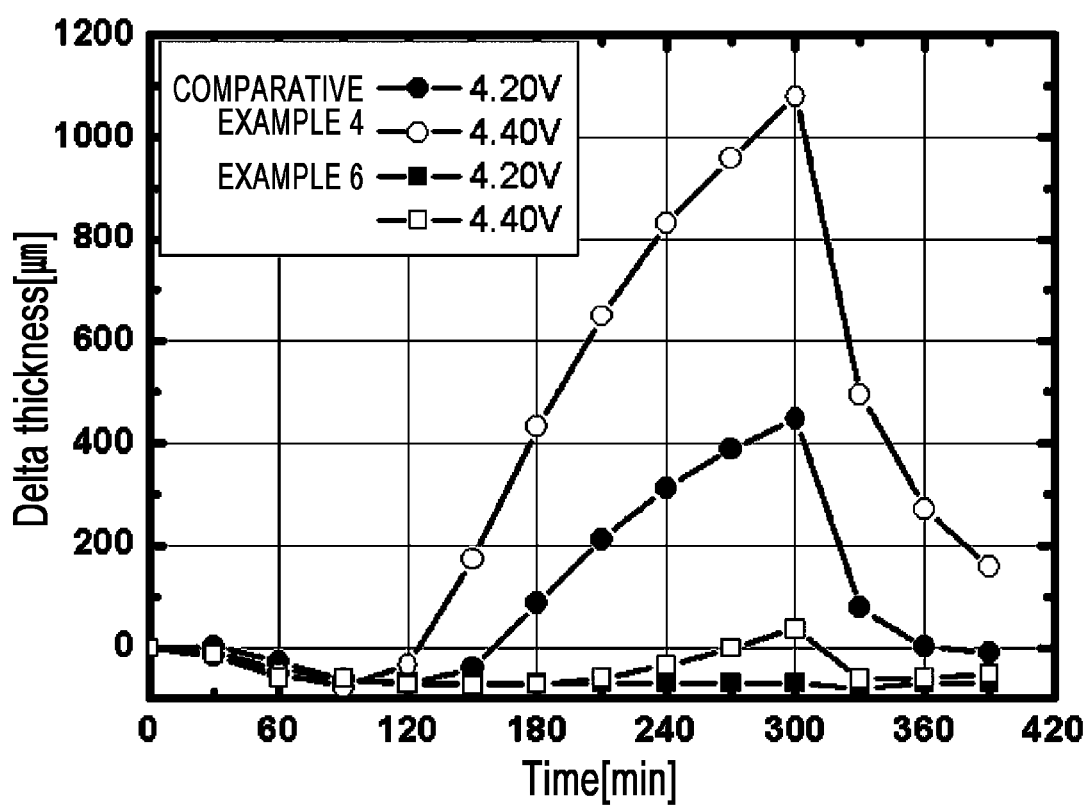
FIG. 1 is a graph illustrating the change in thickness over time to measure the swelling under high temperature and high voltage conditions for batteries according to Example 6 and Comparative Example 4.

The present invention will now be described in detail. It should be understood that terms and words used in the specification and the appended claims should not be construed as having common and dictionary meanings, but should be interpreted as having meanings and concepts corresponding to technical ideas of the present invention in view of the principle that the inventor can properly define the concepts of the terms and words in order to describe his/her own invention as best as possible.

A non-aqueous electrolyte for a lithium secondary battery according to the present invention includes an ionizable lithium salt and an organic solvent, and may further include (a) 1 to 10 parts by weight of a compound having a vinylene group or vinyl group per 100 parts by weight of the non-aqueous electrolyte, and (b) 10 to 300 parts by weight of a dinitrile compound having an ether bond represented by the following chemical formula 1 per 100 parts by weight of the compound having the vinylene group or vinyl group:

[Chemical formula 1]

where $R_1$ to $R_3$ are each independently $C_1$-$C_5$ alkylene or alkenylene, and m is an integer of 1 to 5.

When the compound having the vinylene group or vinyl group according to the present invention is used in a non-aqueous electrolyte for a battery, a passive film called a solid electrolyte interface (SEI) film is formed on the surface of an anode during initial charge, which suppresses the reduction and decomposition of carbonate as a non-aqueous solvent and improves the charge/discharge efficiency, resulting in good cycling characteristics.

However, when the compound having the vinylene group or vinyl group is used in a carbonate-based electrolyte as described above, the electrolyte is thermally weak and thus is susceptible to decomposition under high temperature conditions. The generated decomposition gas deforms a pouch-shaped electrode assembly or a cylindrical or prismatic electrode assembly, resulting in internal short circuit. In severe cases, ignition or explosion of batteries may occur.

Under high temperature conditions, gas generation increases with the increasing content of an additive capable of forming a film on an anode. In particular, when vinylene carbonate (VC) is used as the additive capable of forming a film on an anode, VC remaining in the electrolyte after forming a SEI film on an anode oxidizes a cathode under high temperature conditions, resulting in rapid gas generation.

To solve this problem, the non-aqueous electrolyte of the present invention may further include a dinitrile compound having an ether bond. The dinitrile compound having an ether bond may form a complex on the surface of a cathode of lithium transition metal oxide to prevent an oxidation reaction between the electrolyte and the cathode, thereby suppressing heat generation, and to prevent the compound having the vinylene group or vinyl group and the electrolyte from decomposing when stored under high temperature conditions, thereby suppressing the swelling of the battery.

In the present invention, the "vinylene group" is defined as —CH=CH—, and the "vinyl group" is defined as $CH_2$=CH—. The compound having the vinylene group or vinyl group may include any one of a vinylene carbonate-based compound, an acrylate-based compound having a vinyl group, a sulfonate-based compound having a vinyl group, and an ethylene carbonate-based compound having a vinyl group, or mixtures thereof.

For example, the vinylene carbonate-based compound may be vinylene carbonate. More specifically, the compound having the vinyl group may be a compound represented by the following chemical formula 2:

[Chemical formula 2]

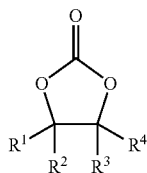

where at least one of $R_1$ to $R_4$ has a vinyl group, and the others are each independently hydrogen, halogen, a $C_1$-$C_6$ alkyl group unsubstituted or substituted with halogen, a $C_6$-$C_{12}$ aryl group, a $C_2$-$C_6$ alkenyl group, or a sulfonate group.

In the non-aqueous electrolyte of the present invention, the content of the compound having the vinylene group or vinyl group may be 1 to 10 parts by weight, preferably 1 to 7 parts by weight, more preferably 1 to 5 parts by weight, per 100 parts by weight of the non-aqueous electrolyte. When the content is less than 1 part by weight, the effect of suppressing the swelling under high temperature conditions is insufficient. When the content exceeds 10 parts by weight, the high-temperature cycling characteristics considerably deteriorates during charge/discharge cycles under high temperature conditions.

Optionally, the non-aqueous electrolyte of the present invention may further include cyclic carbonate substituted with halogen. The cyclic carbonate substituted with halogen may be used with the compound having the vinylene group or vinyl group to improve the properties of a SEI film formed on the surface of an anode, thereby further suppressing the swelling of the battery.

The cyclic carbonate substituted with halogen according to the present invention may be represented by the following chemical formula 3:

[Chemical formula 3]

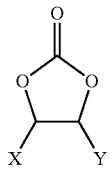

where X and Y are each independently hydrogen, chlorine, or fluorine, and both X and Y are not hydrogen.

Preferably, the content of a mixture of the cyclic carbonate substituted with halogen and the compound having the vinylene group or vinyl group may be 1 to 10 parts by weight per 100 parts by weight of the non-aqueous electrolyte. The mixing content may vary depending on the use of the battery, for example, a weight ratio of the cyclic carbonate substituted with halogen relative to the compound having the vinylene group or vinyl group is 1:0.5 to 1:5, however the present invention is not limited in this regard. When the proportion of the compound having the vinylene group or vinyl group relative to the cyclic carbonate substituted with halogen is less than 0.5, the high-temperature charge/discharge performance deteriorates. When the proportion of the compound having the vinylene group or vinyl group exceeds 5, the interfacial resistance of an anode greatly increases and as a result, the initial performance of a battery deteriorates. This may be judged as the compound having the vinylene group or vinyl group forming a relatively dense SEI film, however this interpretation is not limited in this regard.

As described above, the organic solvent used in the non-aqueous electrolyte for a lithium secondary battery disadvantageously is oxidized and decomposes on the surface of a cathode during charge/discharge. In particular, when lithium transition metal oxide is used as a cathode active material, the transition metal acts as an oxidizing agent to induce the electrolyte decomposition, which is accelerated under high temperature conditions.

However, the dinitrile compound having an ether bond according to the present invention forms a complex on the surface of a cathode of lithium transition metal oxide to prevent an oxidation reaction between the electrolyte and the cathode, thereby suppressing the heat generation and preventing the internal short circuit that may occur due to the rapid temperature increase of the battery.

A variety of compounds may exist in the non-aqueous electrolyte during charge/discharge. Among them, HF or $PF_5$ creates acidic conditions in the non-aqueous electrolyte. The acidic conditions accelerate the oxidation reaction of the non-aqueous electrolyte on the surface of the cathode.

According to the present invention, oxygen (—O—) in the dinitrile compound having an ether bonds with HF or $PF_5$ in the non-aqueous electrolyte to hinder the creation of acidic conditions, thereby preventing the oxidation and decomposition of the non-aqueous electrolyte.

Furthermore, the dinitrile compound having an ether bond may improve the performance of a battery better than conventional additives. Specifically, the dinitrile compound having an ether bond may contribute to a battery with excellent capacity retention and excellent electrochemical characteristics including the extended charge/discharge cycle life.

For example, the dinitrile compound having an ether bond may include, but is not limited to, any one selected from the group consisting of 3,5-dioxa-heptanedinitrile, 1,4-bis(cyanoethoxy)butane, bis(2-cyanoethyl)-monoformal, bis(2-cyanoethyl)-diformal, bis(2-cyanoethyl)-triformal, ethyleneglycol bis(2-cyanoethyl)ether, diethyleneglycol bis(2-cyano ethyl) ether, triethyleneglycol bis(2-cyanoethyl)ether, tetraethyleneglycol bis(2-cyanoethyl)ether, 3,6,9,12,15,18-hexaoxaeicosane dinitrile, 1,3-bis(2-cyanoethoxy)propane, 1,4-bis(2-cyanoethoxy)butane, 1,5-bis(2-cyanoethoxy)pentane, and ethyleneglycol bis(4-cyanobutyl)ether, or mixtures thereof.

Preferably, the content of the dinitrile compound having an ether bond may be 10 to 300 parts by weight per 100 parts by weight of the compound having the vinylene group or vinyl group. When the content is less than 10 parts by weight, the swelling suppression effect is insufficient. When the content exceeds 300 parts by weight, the ionic conductivity of the non-aqueous electrolyte reduces and the high-rate charge/discharge characteristics deteriorates. More preferably, the content of the dinitrile compound having an ether bond may be 30 to 300 parts by weight, most preferably 50 to 250 parts by weight, per 100 parts by weight of the compound having the vinylene group or vinyl group.

In addition to the compound having the vinylene group or vinyl group and the cyclic carbonate substituted with halogen, the non-aqueous electrolyte of the present invention may further include a compound capable of forming a passive film on the surface of an anode, when needed, without departing from the scope of the present invention. Examples of such a compound may include, but are not limited to, a sulfur-containing compound such as propane sultone, ethylene sulfite or propene sultone, and a lactam-based compound such as N-acetyl lactam.

In the non-aqueous electrolyte of the present invention, the lithium salt contained as an electrolyte solute is not particularly limited if it is conventionally used in an electrolyte for a lithium secondary battery. For example, an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In the non-aqueous electrolyte of the present invention, the organic solvent is not particularly limited if it is conventionally used in an electrolyte for a lithium secondary battery. For example, the organic solvent may include any one of ether, ester, amide, linear carbonate, cyclic carbonate, or mixtures thereof.

Among them, cyclic carbonate, linear carbonate, or mixtures thereof, that is, carbonate compounds may represent the organic solvent. For example, cyclic carbonate may include, but is not limited to, any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate (VC) and halide thereof, or mixtures thereof. Examples of linear carbonate may include, but are not limited to, any one selected from the group consisting of dimethyl carbonate (DMC), diethyl carbonate (DEC), dipropyl carbonate, ethylmethyl carbonate (EMC), methylpropyl carbonate and ethylpropyl carbonate, or mixtures thereof.

Among these carbonate-based organic solvents, cyclic carbonate, in particular, ethylene carbonate and propylene carbonate are preferred since they have high viscosity and consequently a high dielectric constant, and thus can easily dissociate the lithium salt in the electrolyte. More preferably, when linear carbonate having low viscosity and a low dielectric constant, such as dimethyl carbonate and diethyl carbonate, is mixed with cyclic carbonate at a suitable ratio, the mixture contributes to a high electric conductivity of an electrolyte.

The ether-based organic solvent may include, but is not limited to, any one selected from the group consisting of dimethyl ether, diethyl ether, dipropyl ether, methylethyl ether, methylpropyl ether, and ethylpropyl ether, or mixtures thereof.

The ester-based organic solvent may include, but is not limited to, any one selected from the group consisting of methyl acetate, ethyl acetate, propyl acetate, methyl propionate, ethyl propionate, γ-butyrolactone, γ-valerolactone, γ-caprolactone, σ-valerolactone, and ∈-caprolactone, or mixtures thereof.

The non-aqueous electrolyte of the present invention may be used in fabricating a lithium secondary battery by injecting into a battery casing receiving an electrode assembly comprising a cathode, an anode, and a separator interposed therebetween. The cathode, the anode, and the separator constituting the electrode assembly may include all typical ones conventionally used in fabricating lithium secondary batteries.

Specifically, lithium-containing transition metal oxide is preferably used as a cathode active material, for example, any one selected from the group consisting of $Li_xCoO_2$ (0.5<x<1.3), $Li_xNiO_2$(0.5<x<1.3), $Li_xMnO_2$(0.5<x<1.3), $Li_xMn_2O_4$(0.5<x<1.3), $Li_x(Ni_aCo_bMn_c)O_2$(0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$(0.5<x<1.3, 0≤y<1), $Li_xNi_{1-y}Mn_yO_2$(0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$(0.5<x<1.3, 0<z<2), $Li_xMn_{2-z}Co_zO_4$(0.5<x<1.3, 0<z<2), $Li_xCoPO_4$(0.5<x<1.3), and $Li_xFePO_4$(0.5<x<1.3), or their mixtures. The lithium-containing transition metal oxide may be coated with metal such as Al or metal oxide. Also, lithium-containing transition metal sulfide, selenide, or halide may be used as well as lithium-containing transition metal oxide.

As an anode active material, carbon-based materials capable of intercalating and deintercalating lithium ions, lithium metals, silicon, or tin may be generally used. Also, metal oxide having a potential of 2V or less based on lithium, for example, $TiO_2$ or $SnO_2$, may be used. Among them, the carbon-based materials are preferred, for example, low crystallinity carbon or high crystallinity carbon. Typically, low crystallinity carbon includes soft carbon and hard carbon, and high crystallinity carbon includes high temperature sintered carbon such as natural graphite, artificial graphite, Kish graphite, pyrolytic carbon, mesophase pitch based carbon fiber, meso-carbon microbeads, mesophase pitches, petroleum derived cokes, and tar pitch derived cokes.

The cathode and/or the anode may include a binder, and the binder may be an organic binder such as polyvinylidene-fluoride-hexafluoropropylene copolymer (PVDF-co-HFP), polyvinylidenefluoride, polyacrylonitrile or polymethyl-methacrylate, or an aqueous binder such as styrene butadiene rubber (SBR). The binder may be used with a thickening agent such as carboxymethyl cellulose (CMC). The aqueous binder is preferred since it has excellent adhesive strength and thus even a small amount can provide excellent adhesive performance.

The separator may include, but is not limited to, a single-layered or multi-layered porous polymer film and a porous non-woven fabric, conventionally used as a separator. The porous polymer film may be made from polyolefin-based polymer, for example, ethylene homopolymer, propylene homopolymer, ethylene/butene copolymer, ethylene/hexene copolymer, and ethylene/methacrylate copolymer, and the porous non-woven fabric may be made from, for example, high-melting glass fibers or polyethylene terephthalate fibers. However, the present invention is not limited in this regard.

The lithium secondary battery of the present invention is not limited to a specific shape, but may have a cylindrical shape, a prismatic shape, a pouch shape, or a coin shape.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

Example 1

<Preparation of Non-Aqueous Electrolyte>

1 part by weight of vinylene carbonate (VC), 3 parts by weight of fluoroethylene carbonate (FEC), and 1 part by weight of ethyleneglycol bis(2-cyanoethyl)ether (EGPN) were added to an electrolyte of 1M $LiPF_6$ dissolved in ethylene carbonate:propylene carbonate:diethyl carbonate (3:2:5 by weight) under an Ar atmosphere, per 100 parts by weight of the electrolyte.

<Fabrication of Battery>

LiCoO$_2$ as a cathode active material, polyvinylidene fluoride (PVdF) as a binder, and carbon as a conductive material were mixed at a weight ratio of 93:4:4, and then dispersed in N-methyl-2-pyrrolidone, to prepare a cathode slurry that was coated on an aluminum foil of 15 μm thickness, followed by drying and rolling, to manufacture a cathode.

Natural graphite as an anode active material, styrene butadiene rubber (SBR) as a binder, and carboxymethyl cellulose as a thickening agent were mixed at a weight ratio of 96:2:2, and then dispersed in water, to prepare an anode slurry that was coated on a copper foil of 10 μm thickness, followed by drying and rolling, to manufacture a cathode.

Next, the cathode and the anode were placed with a porous separator interposed therebetween, and the electrolyte was injected, to fabricate a pouch-type battery.

Example 2

<Preparation of Non-Aqueous Electrolyte>

2 parts by weight of vinylene carbonate (VC), 2 parts by weight of fluoroethylene carbonate (FEC), and 3 parts by weight of ethyleneglycol bis(2-cyanoethyl)ether (EGPN) were added to an electrolyte of 1M LiPF$_6$ dissolved in ethylene carbonate:ethyl propionate:diethyl carbonate (4:1:5 by weight) under an Ar atmosphere, per 100 parts by weight of the electrolyte.

<Fabrication of Battery>

A battery comprising the electrolyte of Example 2 was fabricated in the same way as Example 1 except that the fabricated battery is a prismatic battery.

Example 3

A non-aqueous electrolyte and a battery were manufactured in the same way as Example 1 except that 2 parts by weight of ethyleneglycol bis(2-cyanoethyl)ether (EGPN) was added.

Example 4

A non-aqueous electrolyte and a battery were manufactured in the same way as Example 1 except that 3 parts by weight of ethyleneglycol bis(2-cyanoethyl)ether (EGPN) was added.

Example 5

A non-aqueous electrolyte and a battery were manufactured in the same way as Example 1 except that 2 parts by weight of vinylene carbonate (VC), 3 parts by weight of fluoroethylene carbonate (FEC), and 3 parts by weight of ethyleneglycol bis(2-cyanoethyl)ether (EGPN) were added per 100 parts by weight of the electrolyte.

Example 6

A non-aqueous electrolyte and a battery were manufactured in the same way as Example 5 except that 5 parts by weight of ethyleneglycol bis(2-cyanoethyl)ether (EGPN) was added.

Example 7

A non-aqueous electrolyte and a battery were manufactured in the same way as Example 5 except that 6 parts by weight of ethyleneglycol bis(2-cyanoethyl)ether (EGPN) was added.

Example 8

A non-aqueous electrolyte and a battery were manufactured in the same way as Example 1 except that 3 parts by weight of vinylene carbonate (VC), 3 parts by weight of fluoroethylene carbonate (FEC), and 3 parts by weight of ethyleneglycol bis(2-cyanoethyl)ether (EGPN) were added per 100 parts by weight of the electrolyte.

Example 9

A non-aqueous electrolyte and a battery were manufactured in the same way as Example 8 except that 6 parts by weight of ethyleneglycol bis(2-cyanoethyl)ether (EGPN) was added.

Example 10

A non-aqueous electrolyte and a battery were manufactured in the same way as Example 9 except that 9 parts by weight of ethyleneglycol bis(2-cyanoethyl)ether (EGPN) was added.

Comparative Example 1

An electrolyte and a battery were manufactured in the same way as Example 1 except that ethyleneglycol bis(2-cyanoethyl)ether (EGPN) was not added.

Comparative Example 2

An electrolyte and a battery were manufactured in the same way as Example 5 except that ethyleneglycol bis(2-cyanoethyl)ether (EGPN) was not added.

Comparative Example 3

An electrolyte and a battery were manufactured in the same way as Example 8 except that ethyleneglycol bis(2-cyanoethyl)ether (EGPN) was not added.

Comparative Example 4

An electrolyte and a battery were manufactured in the same way as Example 6 except that 5 parts by weight of ethyleneglycol bis(2-cyanoethyl)ether (EGPN) was replaced with 5 parts by weight of succinonitrile (SN).

Comparative Example 5

An electrolyte and a battery were manufactured in the same way as Example 2 except that 3 parts by weight of ethyleneglycol bis(2-cyanoethyl)ether (EGPN) was replaced with 3 parts by weight of succinonitrile (SN).

Experimental Example 1: Measure of Swelling Under High Temperature and High Voltage Conditions The batteries fabricated according to Examples 1 to 10 and Comparative Examples 1 to 5 were tested to evaluate the swelling under high temperature and high voltage conditions.

Specifically, each battery was charged (charging voltage: 4.20 to 4.40V), then heated to raise the room temperature up to 90° C. at a rate of 1° C./min, and then left at 90° C. for 4 hours before dropping the temperature down to room temperature for 1 hour.

The swelling was evaluated by measuring a maximum thickness change (ΔT) relative to an initial thickness, and the results are shown in Table 1.

TABLE 1

| | Additive | | | Charging voltage | Thickness change |
|---|---|---|---|---|---|
| | VC | EGPN | SN | (V) | (ΔT/μm) |
| Example 1 | 1 | 1 | 0 | 4.20 | 127 |
| Example 2 | 2 | 3 | 0 | 4.40 | 465 |
| Example 3 | 1 | 2 | 0 | 4.20 | 0[1)] |
| Example 4 | 1 | 3 | 0 | 4.20 | 0 |
| Example 5 | 2 | 3 | 0 | 4.20 | 86 |
| Example 6 | 2 | 5 | 0 | 4.20 | 0 |
| | | | | 4.40 | 36 |
| Example 7 | 2 | 6 | 0 | 4.20 | 0 |
| Example 8 | 3 | 3 | 0 | 4.20 | 411 |
| Example 9 | 3 | 6 | 0 | 4.20 | 18 |
| Example 10 | 3 | 9 | 0 | 4.20 | 0 |
| Comparative example 1 | 1 | 0 | 0 | 4.20 | 1017 |
| Comparative example 2 | 2 | 0 | 0 | 4.20 | 1407 |
| Comparative example 3 | 3 | 0 | 0 | 4.20 | 1878 |
| Comparative example 4 | 2 | 0 | 5 | 4.20 | 448 |
| | | | | 4.40 | 1096 |
| Comparative example 5 | 2 | 0 | 3 | 4.40 | 891 |

[1)]When swelling does not occur due to the weight of a thickness measuring machine and rather the change in thickness shows a minus value, such thickness change is indicated as "0".

As shown in Table 1, it was found that the higher the content of VC, the more the battery swells under high temperature conditions. However, the battery samples including ethyleneglycol bis(2-cyanoethyl)ether (EGPN) considerably reduced in swelling.

Figure 2:
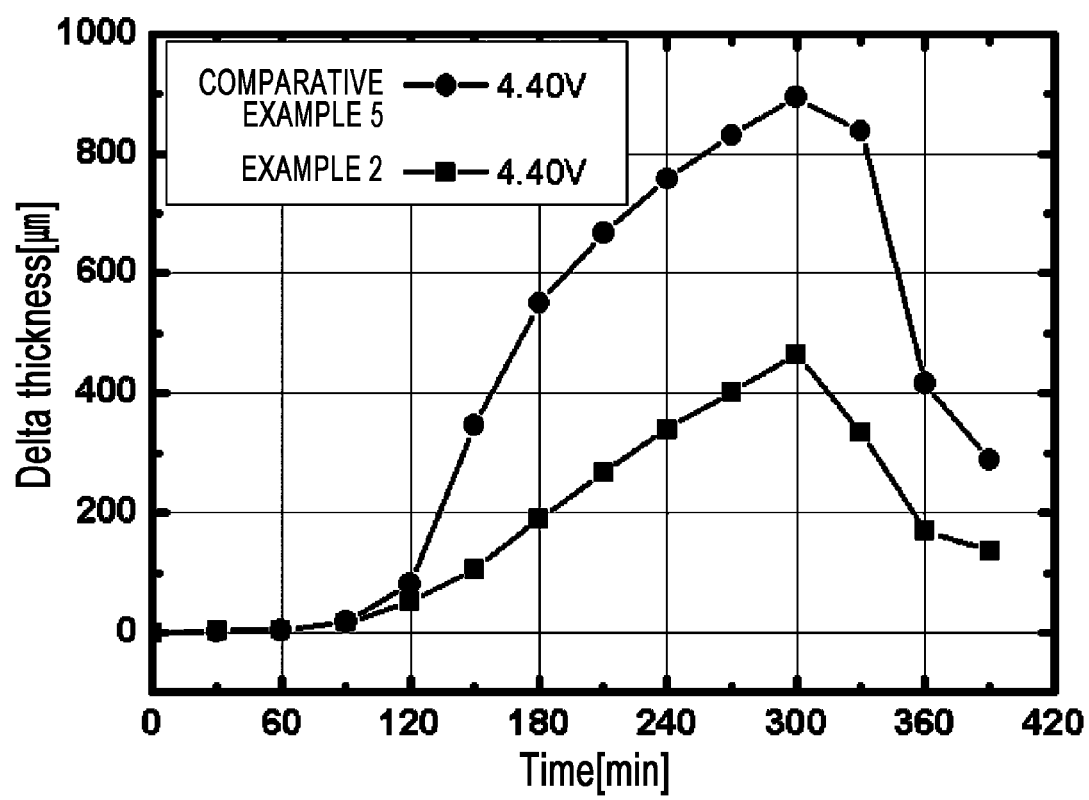
FIG. 2 is a graph illustrating the change in thickness over time to measure the swelling under high temperature and high voltage conditions for batteries according to Example 2 and Comparative Example 5.

FIGS. 1 and 2 graphically illustrate the change in thickness over time for Examples 6 and 2 and corresponding Comparative example 4 and 5 using succinonitrile (SN) in place of ethyleneglycol bis(2-cyanoethyl)ether (EGPN), respectively.

Referring to Table 1 and FIGS. 1 and 2, it can be seen that the swelling suppression effect of ethyleneglycol bis(2-cyanoethyl)ether (EGPN) is superior to that of succinonitrile (SN).

Experimental Example 2: Measure of Charge/Discharge Cycle Life Under High Temperature Conditions The batteries fabricated according to Example 6 and Comparative example 4 were charged and discharged within the voltage range of 3.0 to 4.2V at 45° C. The charge/discharge cycles were repeated. The capacity retention relative to initial capacity is shown in FIG. 3.

Figure 3:
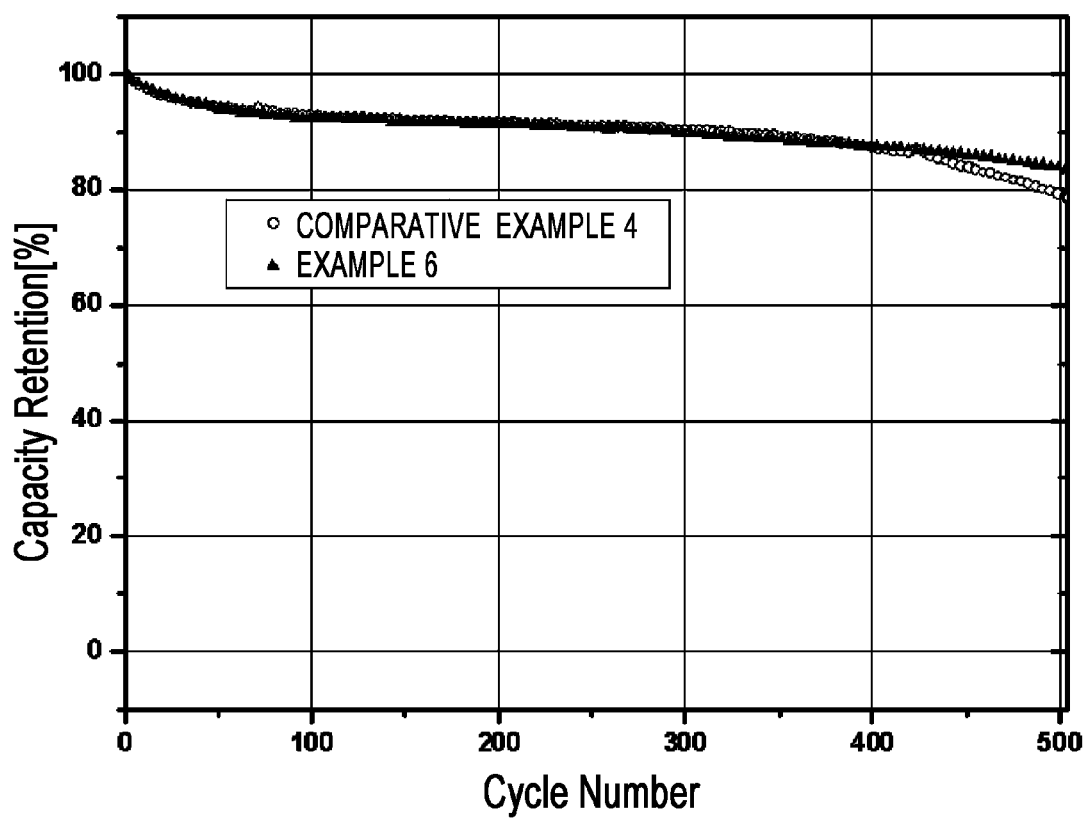
FIG. 3 is a graph illustrating the capacity retention relative to the initial capacity vs the charge/discharge cycle number under high temperature and high voltage conditions for batteries according to Example 6 and Comparative Example 4.

As shown in FIG. 3, it is found that ethyleneglycol bis(2-cyanoethyl)ether (EGPN) is more effective in improving the charge/discharge cycle life under high temperature conditions than succinonitrile (SN).

According to teachings above, the non-aqueous electrolyte of the present invention may contribute to a lithium secondary battery having suppression of swelling and improvement of charge/discharge cycle life. In particular, the effect of suppressing the swelling and improving the charge/discharge cycle life is remarkable under high temperature and high voltage conditions.

What is claimed is:

1. A non-aqueous electrolyte for a lithium secondary battery consisting of: an ionizable lithium salt; an organic solvent
   1 to 3 parts by weight of vinylene carbonate per 100 parts by weighty of the non-aqueous electrolyte;
   1 to 3 parts by weight of ethyleneglycol bis(2-cyanoethyl) ether per 1 part by weight of the vinylene carbonate; and
   2 to 3 parts by weight of fluoroethylene carbonate per 100 parts by weight of the non-aqueous electrolyte.

2. The non-aqueous electrolyte for a lithium secondary battery according to claim 1, wherein an anion of the ionizable lithium salt is any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

3. The non-aqueous electrolyte for a lithium secondary battery according to claim 1, wherein the organic solvent comprise ethylene carbonate and propylene carbonate.

4. The non-aqueous electrolyte for a lithium secondary battery according to claim 3, wherein the organic solvent further comprise diethyl carbonate, methyl propionate, ethyl propionate, or mixtures of at least two thereof.

5. The non-aqueous electrolyte for a lithium secondary battery according to claim 1, wherein the organic solvent comprise ethylene carbonate, propylene carbonate, and diethyl carbonate.

6. The non-aqueous electrolyte for a lithium secondary battery according to claim 1, wherein the organic solvent comprise ethylene carbonate, propylene carbonate, and ethyl propionate.

7. The non-aqueous electrolyte for a lithium secondary battery according to claim 5, wherein the ethylene carbonate, the propylene carbonate, and the diethyl carbonate are in a ratio of 3:2:5.

8. A lithium secondary battery comprising: an electrode assembly including a cathode, an anode, and a separator interposed there between; a battery casing receiving the electrode assembly; and the non-aqueous electrolyte of claim 1 injected in the battery casing.

9. The lithium secondary battery according to claim 8, wherein the anode further includes an aqueous binder.

* * * * *